United States Patent [19]

Simizu

[11] 4,380,754
[45] Apr. 19, 1983

[54] ELECTRIC INDICATOR UTILIZING AN OSCILLATION SOURCE OF A CRYSTAL CLOCK FOR AUTOMOBILES

[75] Inventor: Akio Simizu, Tonemachi, Japan

[73] Assignee: Niles Parts Co., Ltd., Tokyo, Japan

[21] Appl. No.: 870,805

[22] Filed: Jan. 19, 1978

[51] Int. Cl.³ .............................................. B60Q 1/34
[52] U.S. Cl. ...................................... 340/73; 340/80; 340/81 R
[58] Field of Search ............... 340/73, 81 R, 80, 81 F, 340/67, 74, 84, 72, 78, 76, 331; 315/200 A; 307/10 LS

[56] References Cited

U.S. PATENT DOCUMENTS

| | | | |
|---|---|---|---|
| 3,408,625 | 10/1968 | Skinner | 340/73 |
| 3,858,177 | 12/1974 | Kugelmann et al. | 340/73 |
| 3,914,737 | 10/1975 | Sato | 340/73 |
| 3,940,657 | 2/1976 | Kasiewicz et al. | 340/81 R |
| 3,987,424 | 10/1976 | Brouwer et al. | 340/80 |
| 4,105,996 | 8/1978 | Shimizu | 340/73 |

*Primary Examiner*—Donnie L. Crosland
*Attorney, Agent, or Firm*—Lane, Aitken & Kananen

[57] ABSTRACT

A turning indicator with high accuracy and reliability for its ON-OFF operational period, regardless of external conditions such as changes in ambient temperature and voltage of the battery, by means of the utilization of an oscillation source of a crystal clock used for automobiles.

7 Claims, 8 Drawing Figures

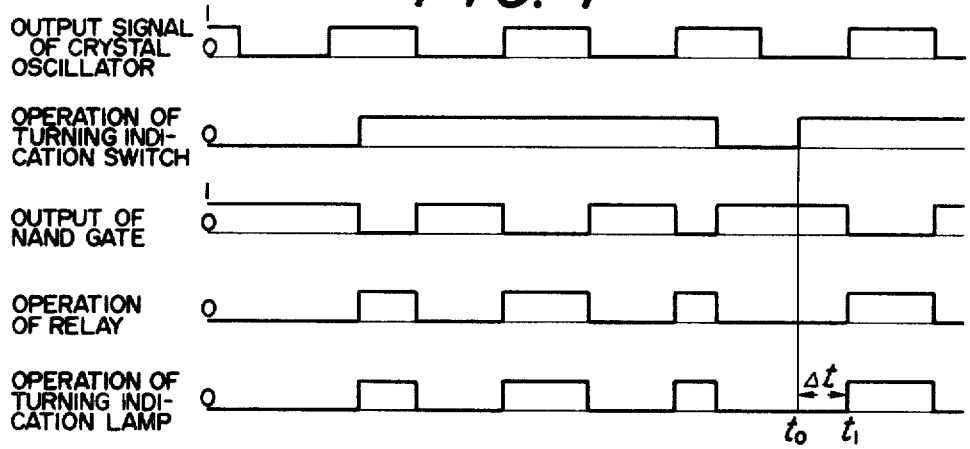
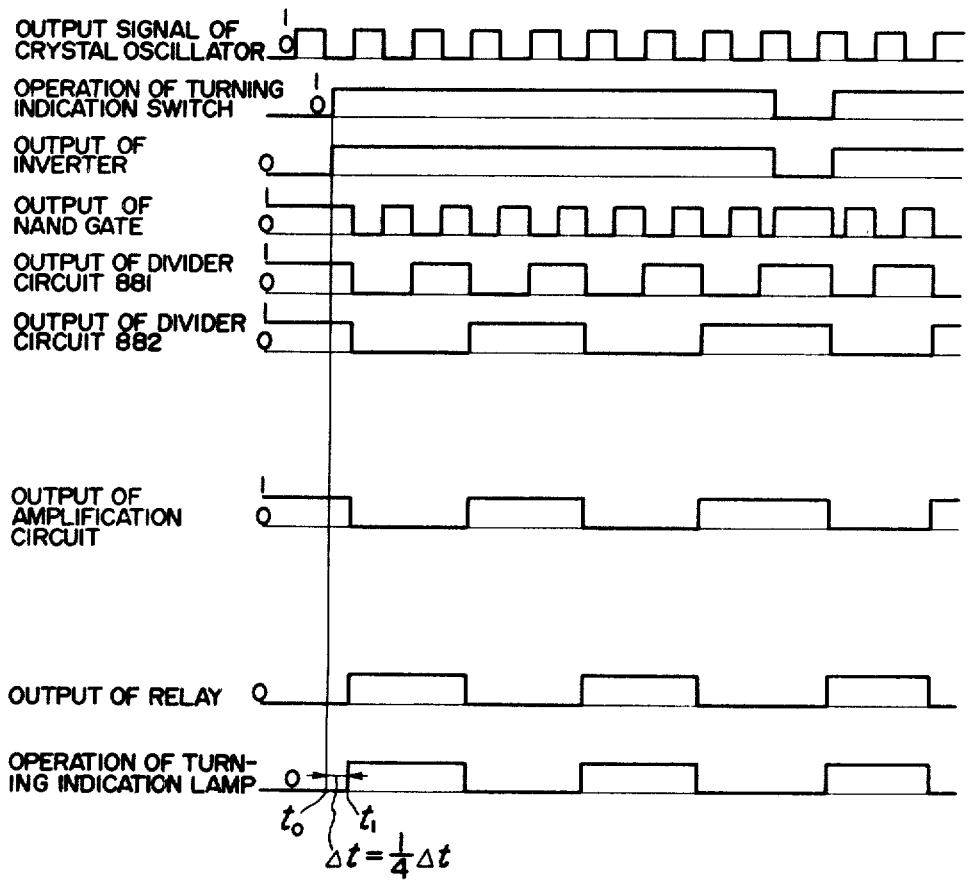

ELECTRIC INDICATOR UTILIZING AN OSCILLATION SOURCE OF A CRYSTAL CLOCK FOR AUTOMOBILES

REFERENCE TO RELATED APPLICATIONS

This application is related to U.S. Ser. No. 760,717 filed Jan. 19, 1977, issued Aug. 8, 1978 as U.S. Pat. No. 4,105,996.

BACKGROUND OF THE PRIOR ART

1. Field of the Invention

The present invention relates to an electric indicator utilizing an oscillation source of a crystal clock loaded on automobiles.

2. Description of the Prior Art

Referring now to FIG. 1 showing a conventional electric indicator used for automobiles, an indicator P indicates as to whether electric loads L such as turn indicators are correctly operated or not. The indicator P is actuated by a self-exciting oscillation source S such as a flasher. It is necessary for such the flasher in the assembly process thereof to adjust its periodic cycle of periodic ON-OFF operation of the flasher, and the periodic cycle is undesirably deviated due to external conditions such as changes in ambient temperature and the voltage of the battery loaded on the automobile.

SUMMARY OF THE INVENTION

The object of the present invention is to provide an electric indicator utilizing a crystal oscillation source and having a highly stabilized periodical cycle and a high reliability of the operation thereof.

Further it is another object of the present invention to provide an improvement for removing disadvantages resided upon utilizing the crystal oscillation source.

BRIEF DESCRIPTION OF THE DRAWINGS

FIG. 4 shows a timing chart for the embodiment in FIG. 2.

FIG. 6 shows a timing chart for the embodiment of the present invention in FIG. 5.

DESCRIPTION OF THE PREFERRED EMBODIMENTS

Figure 1:
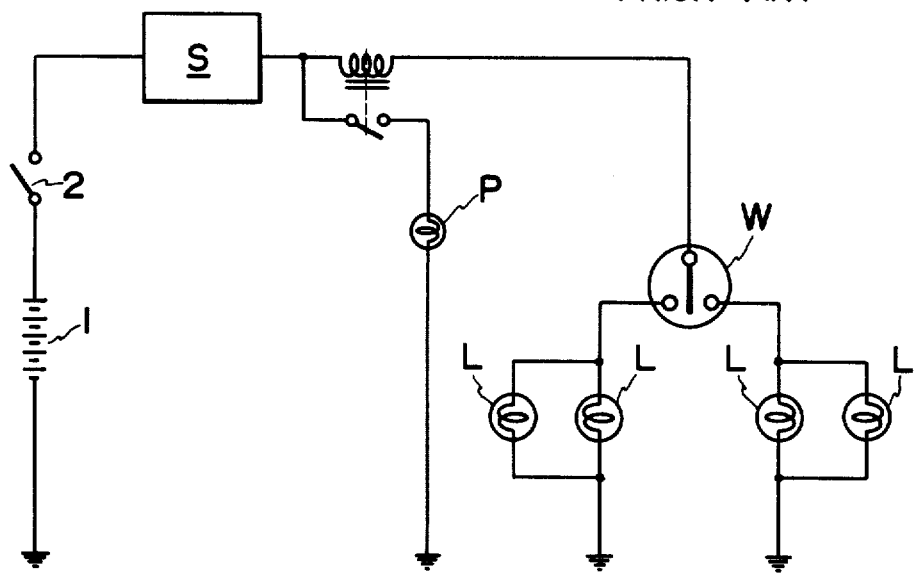
FIG. 1 shows a circuit diagram of a conventional electrical indicator.
Figure 2:
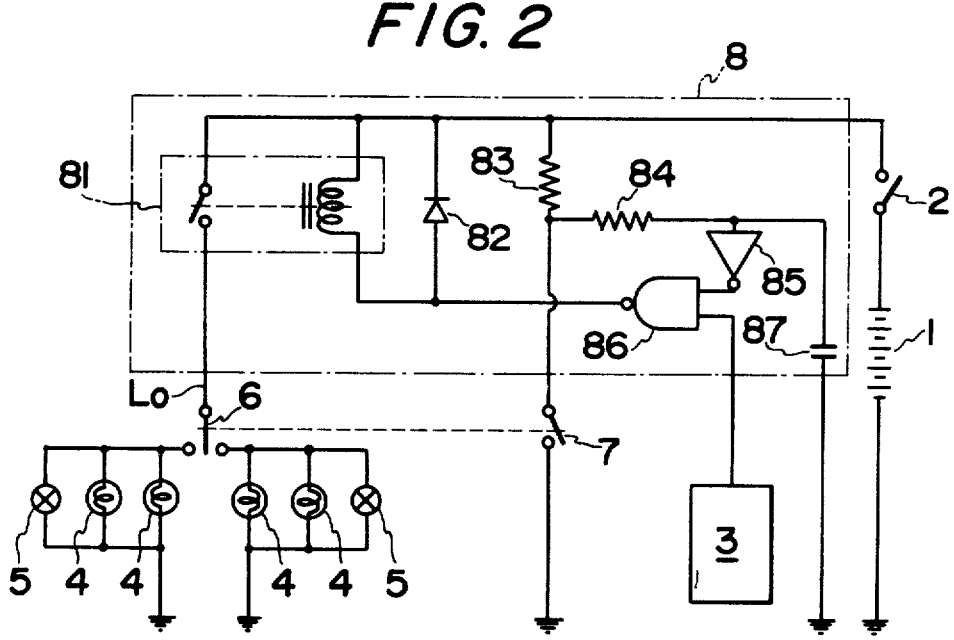
FIG. 2 shows a circuit diagram of a turning indicator of the present invention.
Figure 3:
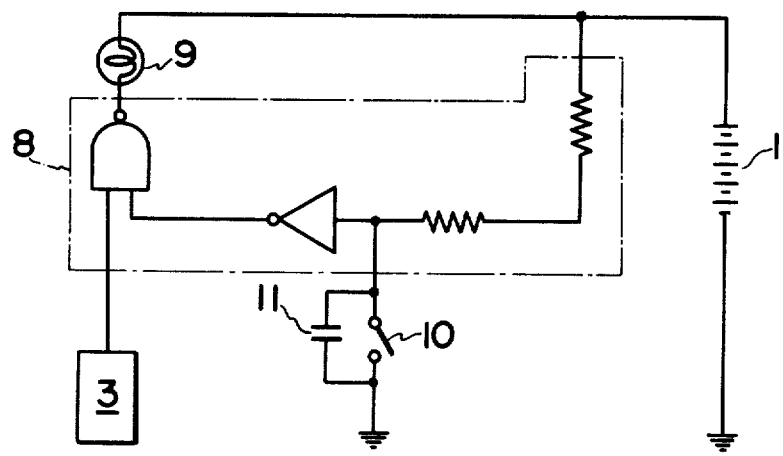
FIG. 3 shows a circuit diagram of a warning device of the present invention.

Referring to FIGS. 2 and 3, a turning indicator utilizing a crystal oscillation source and a warning device for announcing the amount of water, oil and temperature in connection with the automobile are shown respectively. Numeral 1 designates a D.C. current source, 2 an ignition switch, 3 an oscillation source of a crystal clock used for automobiles, 4 turning indication lamps, 5 pilot lamps, 6 a turning indication switch, 7 a synchronized switch which operates in synchronism with the turning indication switch 6, and 8 an amplification circuit comprising resistors, an inverter, a NAND gate, a relay and a diode for amplifying the signal from the crystal oscillation source 3.

Referring now to the operation of the circuit mentioned above, by actuation of the turning switch 6 for right or left turning of the automobile, the synchronized switch 7 is turned on thereby to actuate the turning indicators 4 and the pilot lamps 5, which results in a correct indication indicating the turning of the automobiles.

Further in the case where a filament of one of the turning indicators 4 is disconnected, the pilot lamp 5 is maintained in the OFF state thereof since a relay 81 in the amplification circuit 8 stops its alternate ON-OFF switching operation due to the reduction of current flowing in the filament of the turning indicator 4. Thus, the disconnection of the filament of the turning indicator 4 is advised by the pilot lamp 5 being in an OFF state.

In FIG. 3 there is shown a warning lamp 9 for warning of the amount of liquid, temperature and pressure when the amount reaches a predetermined value. Numeral 10 designates a sensor closed when the amount of liquid such as water reaches to a predetermined value. By closing of the sensor 10 the pulse signal produced from the crystal oscillation source 3 actuates the warning lamp 9 through the amplification circuit 8. In FIG. 2 numeral 81 designates a relay, 82 a protection diode, 83 and 84 resistors, 85 an inverter, 86 a NAND gate, and 87 a condenser.

By using FIG. 4 showing a timing chart, the operation of the turning indicator using the crystal oscillation source 3 will be explained hereinafter. A $\Delta t$ is necessary from the time $t_0$ where the turning indication switch 6 is actuated for right or left turning of the automobile to the time $t_1$ where the operation of the turning indication lamp 4 is started. The period $\Delta t$ corresponds to a half cycle of the output frequency of the crystal oscillation source 3. In the embodiment shown in FIG. 2, one cycle of the output signal of the crystal oscillation source 3 is about 700 m sec, and the delay time $\Delta t$ is about 350 m sec. In the case where the delay time or start time is large, an announcement indicating the turning of the automobile is delayed thereby to cause dangerous conditions at some times.

Referring to the more detailed operation of the turning indicator shown in FIGS. 2 and 4, the waveform of the output sequence from the crystal oscillation source 3 is a pulse signal having two levels 1 and 0. The crystal oscillator 3 usually oscillates the pulse signal. When the turning indication switch 6 stays in a neutral position thereof, the output of the inverter 85 is in low level "0" and the output of the NAND gate 86 is in high level "1". On the other hand, when the turning switch 6 is actuated for the right or left turning of the automobile, the output of the inverter 85 is turned to a high level 1, and the NAND gate 86 produces a pulse signal with two levels 1 and 0 in accordance with the pulse of the crystal oscillator 3. By this the relay 81 is operated thereby to operate the turning indication lamp 4 in accordance with the pulse signal.

If the turning indication switch 6 is closed at the time that the crystal oscillator 3 produces the high level 1, the output of the NAND gate 86 is simultaneously turned from high level 1 to low level 0 and the relay 81 is also turned to a ON state thereby to actuate the turning indication lamp 4.

If the turning indication switch 6 is closed at the time that the crystal oscillator 3 produces the low level 0, the output of the NAND gate 86 is maintained in high level 1 until the output of the crystal oscillator 3 becomes the high level 1.

Thus the possibly maximum period between the time where the switch 6 is actuated and the time where the relay 81 or the lamp is energized, is about a half cycle of the output frequency of the crystal oscillator 3.

Figure 5:
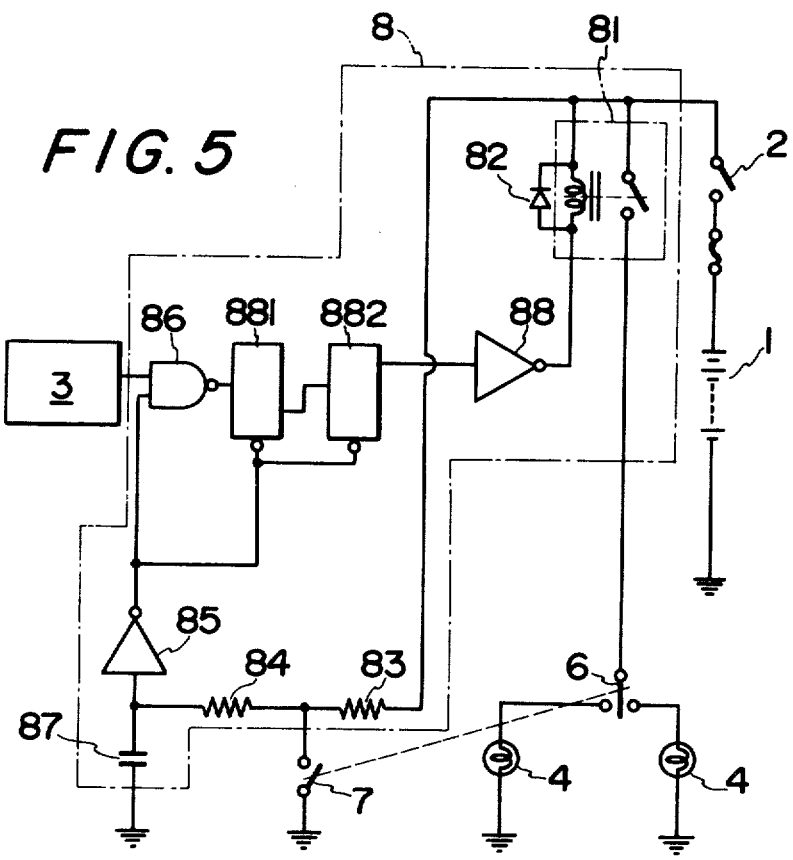
FIGS. 5, 7 and 8 show circuit diagrams for improved embodiments of the present invention.

Referring now to FIG. 5 there is shown an improved embodiment of the turning indicator for an automobile. Numeral 88 designates an amplifier composed of an inverter, and 881 and 882 designate frequency dividers composed of J-K flip flop circuits. As shown in FIG. 5, one of the inputs of the NAND gate 86, that is, the control input, is connected to the output of the inverter 85 and to the reset inputs of the J-K flip flops 881 and 882. The other input of the NAND gate 86, that is, the signal input, is connected to the output of the oscillation source 3 described above. The same numerals as shown in FIG. 2 indicate the same parts or circuit. Referring to the operation of the turning indicator shown in FIG. 5, in the case where the turning indication switch 6 is in its neutral position thereof, the output of the inverter 85 is in low level 0 and the output of the NAND gate 86 is stable in a high level 1. Further the outputs of the dividers 881 and 882 are in a low level 0, the output of the amplifier 88 being in a high level 1, and the relay 81 is not energized.

On the other hand, upon actuation of the turning indication switch 6 the output of the inverter 85 is turned to high level 1 and the NAND gate 86 produces pulse signals with two levels 1 and 0. When the output signal of the NAND gate 86 changes from high level 1 to low level 0, the output of the divider 881 also changes from 1 to 0, and the output of the divider 882 also changes from 0 to 1. Then the output of the amplifier 88 changes from 1 to 0 thereby to actuate the relay 81. In contrast, when the output of the NAND gate 86 changes from level 0 to level 1 the relay 81 changes to its OFF state and the relay 81 is started with interrupted actuation (i.e. ON-OFF motion) thereby to operate the turning indication lamps 4 with the interrupted actuation. In this embodiment there is provided two frequency dividers so that the output frequency of the amplification circuit 88 is about a quarter of the output frequency of the crystal oscillator 3, which results in that the period of the relay 81 for ON-OFF motion is about a quarter of the output frequency of the crystal oscillator 3. FIG. 6 shows a timing chart in the operation of the embodiment shown in FIG. 5. The turning indication switch 6 is closed at $t_o$, and the turning indication lamp 4 is actuated at $t_1$. The $\Delta t'$ is the delay time i.e. the start time of the turning indication lamps 4, and the delay time $\Delta t'$ is a quarter of the delay time $\Delta t$ in the previous embodiment, which results in that the start time of the turning indication lamp can be desirably reduced.

Thus the period from the actuation of the turning indication switch 6 to the actuation of the turning indication lamp 4 can be reduced by providing two frequency dividers 881 and 882.

Figure 7:
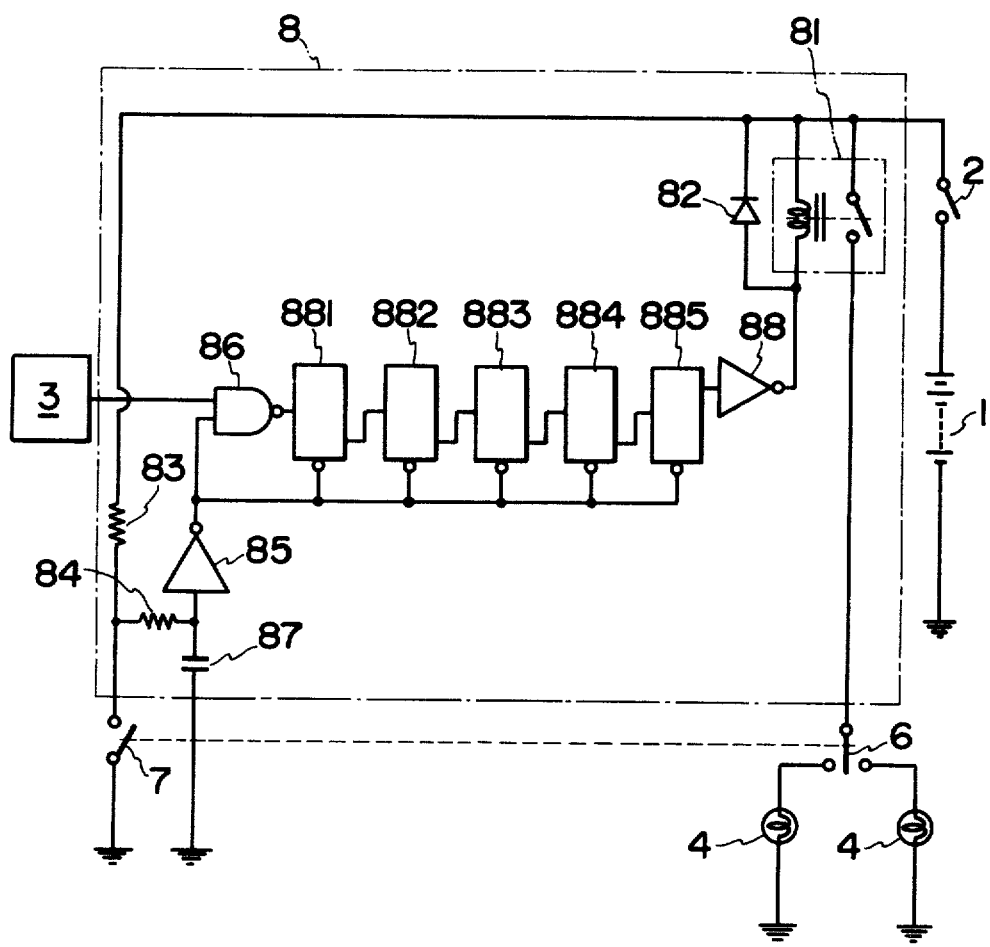

In FIG. 7 there is shown an embodiment of the turning indicator in which five frequency dividers 881, 882, 883, 884 and 885. Each of the dividers is composed of a J-K flip flop circuit of conventional type having their reset inputs connected in the same manner of those of FIG. 5, that is, to the output of the inverter 85 and the control input of the NAND gate 86, and the output frequency of the crystal oscillator 3 is divided into about 1/32 by the five frequency dividers. By this the delay time is remarkably reduced. The operation of the embodiment circuit shown in FIG. 7 is the same as that of FIG. 5.

Thus the delay time or start time is suitably adjustable in accordance with the number of the frequency dividers.

Figure 8:
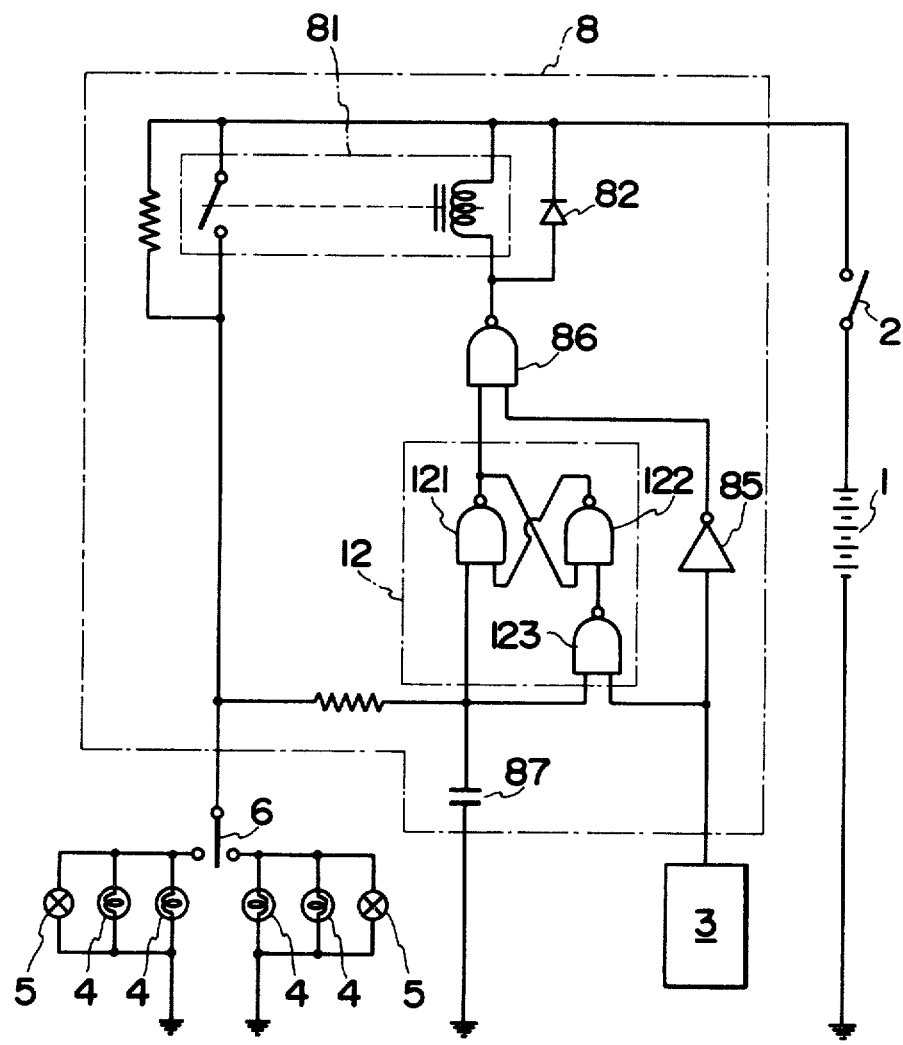

In FIG. 8 there is shown a further improved embodiment of the turning indicator using the crystal oscillation source of automobiles, in which the synchronized switch 7 is omitted to make compact the circuit. The synchronized switch 7 in FIGS. 2 and 7 is necessary as follows, it is detected by the wiring Lo of the turning indication switch 6 without provision of any other detection terminal whether the turning indication switch 6 is in the neutral position or in the closed position. Therefore when the turning indication switch 6 is closed, there is the pulse signal with high and low levels on the wiring Lo. Therefore the synchronized switch 7 in synchronism with the turning indication switch 6 is necessarily provided. Numeral 12 designates a memory circuit composed of NAND gates 121, 122, and 123. The inputs of the NAND gate 123 are connected to the turning indication switch 6 in order to detect the position of the switch 6, and connected to the crystal oscillator 3. One of inputs of the NAND gates 121 and 122 is connected to the output of the NAND gates 122 and 121 respectively. The output of the NAND gate 123 is connected to the other input of the NAND gate 122 and the other input of the NAND gate 121 is connected to the turning indication switch 6 through a resistor. By the NAND gates 121 and 122, a so called set-reset flip flop circuit is composed.

When the turning indication switch 6 is in the neutral position, the output of the NAND gate 121 is in low level 0, the output of the NAND gate 86 being in high level 1, and the relay being maintained in the OFF state. The output signal of the crystal oscillation source 3 is usually produced.

On the other hand, when the turning indication switch 6 is closed for right or left turning of the automobile, this closed operation of the switch 6 is detected by the wiring Lo because the wiring Lo is grounded through the turning indication lamp 4. Therefore, the input terminals of the NAND gates 121 and 123 which are connected to the turning indication switch 6 become in a low level 0. The output of the NAND gate 121 becomes to a high level 1, and the NAND gate 86 produces the pulse signal with high and low levels 1 and 0 thereby to start the ON-OFF motion of the relay 81.

If the turning indication switch 6 is again set in the neutral position, the detection terminal where the wiring Lo is connected to the turning indication switch 6 is turned to high level 1, so that the output of the NAND gate 123 becomes to low level 0 when the output of the crystal oscillator 3 is in a high level 1.

Thus, the output (low level 0) of the NAND gate 121 is stored in the store circuit 12, the output of the NAND gate 86 is maintained in a high level 1 thereby to stop the operation of the relay 81.

As is apparent from the explanation mentioned above, the ON-OFF motion of the turning indication lamp 4 is correctly achieved without the provision of the synchronized switch 7.

The advantages of the present invention can be recited as follows:

(1) The oscillation source in the crystal clock is effectively utilized for the turning indicator, so that an adjusting process for the periodic cycle of the ON-OFF operation (motion) becomes unnecessary and the present invention can provide a turning indicator with high stability and reliability regardless of changes of temperature and voltage of the battery and the like. The turning indicator of the present invention can be applied to an automobile of any type, and requires little electric power by the compact circuit.

(2) The turning indication of the present invention can be widely applied to the field of amount detector for liquid such as water, temperature and pressure.

(3) By provision of the store circuit, the synchronized switch operated in synchronism with the turning indication switch can be omitted thereby to increase the simplicity of circuit and cost.

(4) The oscillation source of the present invention may be provided with a tuning fork and the like.

(5) The reliability provided in the crystal clock can be further increased.

What we claimed is:

1. An electronic turn indicator for automobiles utilizing an oscillation of a crystal clock comprising:
an oscillation source of a crystal clock providing a continuously alternating output signal, a selectively operable amplification circuit operable when enabled to amplify the output signal from said oscillation source of said crystal clock to thereby provide an amplified power signal to an output of said amplification circuit, said amplification circuit including enable logic means including an AND GATE having a signal input connected to receive the output signal from said oscillation source and an enable input for receiving an enable signal and having a plurality of resettable cascaded frequency divider means for dividing the output of said oscillation source, said amplification circuit disabled from amplification and said plural frequency divider means each held in a reset state in the absence of an enable signal, said amplification circuit, when enabled by an enable signal applied to said enable input, releasing simultaneously said plural frequency divider means from their reset state to effect frequency division of the output of said oscillation source and providing the so-divided amplified power signal to the output of said amplification circuit, the alternations of the frequency divided amplified power signal synchronized to the output of said oscillation source, a turn indication lamp, a turn indicator switch for selectively connecting the output of said amplification circuit to said turn indication lamp to energize said lamp intermittently, and circuit means for applying an enable signal to said enable input of said logic means to enable said amplification circuit and to release simultaneously said plural frequency divider means from said reset state only when said turn indicator switch connects the output of said amplification circuit to said indication lamp so that said turn indication lamp is energized within one cycle of the output of said oscillation source after actuation of said turn indicator switch.

2. The electric indicator claimed in claim 1, further comprising a detection switch means, said detection switch means comprises a switch responsive to physical movement of said turn indicator switch for enabling said indication lamp to serve as a warning lamp.

3. The electrical indicator claimed in claim 1, wherein said circuit means comprises a storage circuit having a first state and a second state, which when in the second state said storage circuit applies said enable signal to said enable input of said logic means, means for placing said storage circuit in said second state in response to a low voltage across said turn indication lamp and to switch said storage circuit to said first state in response to a high voltage across said turn indication lamp at a period in time when the alternating output signal of said crystal clock is at a predetermined one of the alternations of its alternating output signal.

4. An electric turn signal indicator for an automobile that utilizes the output oscillations of a crystal clock, comprising:
a crystal clock oscillation source that provides a continuously alternating oscillating signal of a selected frequency;
a logic gate means including an AND-type gate having a signal input connected to receive the oscillating signal of said oscillation source, a control input for receiving an enable input, and an output, said logic gate means enabled by an enable signal applied to its control input to provide the oscillating signal at its signal input to its output and inhibited from providing the oscillating signal to its output in the absence of an enable signal applied to its control input;
a plurality of resettable cascaded frequency dividers connected to said logic gate means for receiving the oscillating signal therefrom and for dividing the oscillation signal when in a non-reset state and disabled from dividing the oscillating signal when in a reset state;
power switching means connected to receive the output of said resettable frequency dividers and connected to a power source for switching power from the power source in response to the output from said frequency dividers;
a turn signal indicator lamp;
turn signal indicator switch connected between said turn signal indicator lamp and said power switching means for selectively connecting the output of said power switching means to said turn signal indicator lamp; and
circuit means connected to said logic gate means and said frequency dividers for (a) applying an enable signal to the control input of said logic means to provide the oscillating signal to said frequency dividers and (b) to release simultaneously said plural frequency dividers from their reset state when said turn indicator switch connects said power switching means and said turn signal indicator lamp so that said turn signal indicator lamp is energized within one cycle of the oscillating signal after actuation of said turn signal indicator switch.

5. The electric turn signal indicator for an automobile claimed in claim 4 wherein:
said logic means comprises a NAND gate.

6. The electric turn signal indicator claimed in claim 4 wherein said circuit means comprises:
a second switch means coupled to said turn indicator switch and connected to said circuit means for applying an enable signal to the control input of said AND-type gate and for applying a signal to the reset input of said frequency dividers for releasing simultaneously said frequency dividers from their reset state.

7. The electric turn signal indicator claimed in claim 6 wherein said frequency divider means comprises:
a plurality of cascaded JK flip-flops each having their respective resest inputs connected to the control input of said AND-type gate.

* * * * *